United States Patent Office 3,822,258
Patented July 2, 1974

3,822,258
4-HYDROXY - 3-(3-ISOXAZOLYLCARBAMOYL)-2H-1,2-BENZOTHIAZINE 1,1-DIOXIDES AND PROCESS FOR THEIR PRODUCTION
Harold Zinnes, Rockaway, Martin L. Schwartz, Gillette, and John Shavel, Jr., Mendham, N.J., assignors to Warner-Lambert Company, Morris Plains, N.J.
No Drawing. Continuation-in-part of application Ser. No. 333,821, Feb. 20, 1973, which is a division of application Ser. No. 119,967, Mar. 1, 1971, now abandoned. This application Apr. 30, 1973, Ser. No. 356,026
Int. Cl. C07d 93/02
U.S. Cl. 260—243 R         6 Claims

ABSTRACT OF THE DISCLOSURE

Compounds having the following structural formula are disclosed:

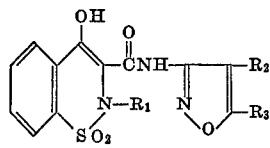

wherein $R_1$ is hydrogen or methyl and $R_2$, and $R_3$ are hydrogen or alkyl. These compounds are useful as anti-inflammatory agents, antipyretics, analgesics.

---

This application is a continuation-in-part of our co-pending application, U.S. Ser. No. 33,821, filed Feb. 20, 1973, which in turn is a divisional of U.S. Ser. No. 119,967 filed Mar. 1, 1971, now abandoned.

The present invention relates to 4-hydroxy-3-(3-isoxazolylcarbamoyl) - 2H-1,2-benzothiazine, 1,1-Dioxides having the following structural formula:

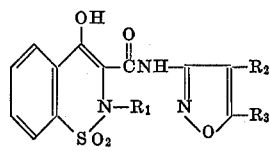

wherein $R_1$ is hydrogen or methyl and $R_2$, and $R_3$ are hydrogen or alkyl having from 1 to 7 carbon atoms, for example, methyl, ethyl, propyl, isopropyl, butyl, isobutyl and the like.

The present invention also includes within its scope the corresponding alkali metal, alkaline earth and amine salts.

The compounds of this invention are useful as anti-inflammatory agents, antipyretics, and analgesics in several mammalian species. When administered orally to rats at a dose of 10–200 mg./kg., they are able to cause reduction in swelling of the paw induced by injection into the foot pads of an irritant such as carragenin. Therapeutically or prophylactically administered orally at a dose of 15–200 mg./kg., the compounds inhibit adjuvant induced polyarthritis in the rat. Oral doses of 25–100 mg./kg. are sufficient to inhibit yeast induced hyperthermia in the rat. At oral doses of 25–200 mg./kg. they exhibit a sigfinificant analgesic effect as determined by the phenylquinone writhing procedure in mice.

Generally speaking, these compounds are indicated in conditions such as pain resulting from arthritis, bursitis and the like. A daily dosage regimen of about 0.5 grams to about 2 grams in several divided doses is recommended for a mammal weighing about 70 kg. body weight to relieve the pain and swelling associated with these conditions. These compounds are administered either orally or by injection.

In order to use these compounds, they are formulated into dosage forms such as tablets or syrups by blending with an inert pharmaceutical carrier such as lactose or simple syrup by methods well known to the pharmacists art. For injectionable dosage forms, they are formulated with vehicles such as water, peanut oil, sesame oil, and the like. In these dosage forms, the active ingredient is from about 0.5 grams to 1 gram per dosage unit.

According to the present invention, the above compounds are prepared by a reaction scheme as follows:

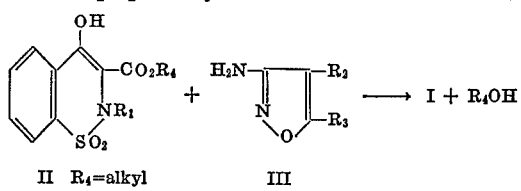

II $R_4$=alkyl    III

Generally speaking, starting compound II is refluxed with 3-aminoisoxazole III in an inert solvent such as xylene. In a preferred embodiment of the present invention, the reactants are refluxed in the presence of a molecular sieve which promote the desired reaction by removing the alcohol which is formed as a by-product. The use of molecular sieves results in a more convenient and practical process in that lengthy distillation to remove the alcohol is no longer required. Typically the reaction is carried out in a Soxhlet apparatus with the molecular sieves contained in the thimble.

Examples of the molecular sieves, which can be used in this process, are commercially available molecular sieves under the trade name Linde type 4A molecular sieve from Matheson Coleman & Bell Company. See also Fieser & Fieser, "Reagents for Organic Synthesis," Vol. 1.

The starting material II are known compounds and they are prepared in accordance with the description in U.S. Pat. No. 3,501,466.

Starting compound 3-aminoisoxazole is prepared in accordance with the description in Chem. Pharm. Bull. 14, 1277 (1969). The starting compound 3-amino-5-methyl-isoxazole is commercially available from Hoffmann-La Roche. It is prepared in accordance with the description set forth in the Netherlands Pat. No. 6,511,924, issued Mar. 15, 1966.

The corresponding salts with metal or with amine are prepared by treating the above compounds with the desired base e.g. sodium alkoxide, potassium alkoxide, sodium hydroxide, potassium hydroxide, calcium hydroxide, pyrrolidine and the like by conventional procedures.

According to a further feature of this invention, a 2-unsubstituted derivative of structure IV is reacted with sodium hydride in dimethylformamide and the resulting anion is treated with methyl iodide. Under the conditions described, methylation takes place solely at the 2-position. Dilution of the reaction mixture with water results in the precipitation of the crystalline product I in high yield and a high state of purity. This reaction is as follows:

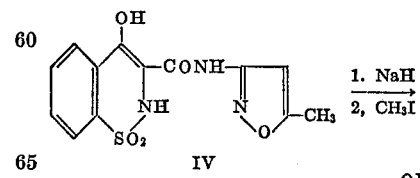

IV

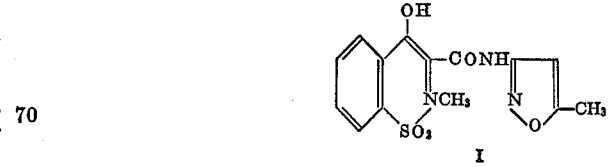

I

EXAMPLE I

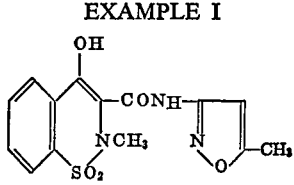

4-Hydroxy-3-(5-methyl-3-isoxazolylcarbamoyl)-2-methyl-2H-1,2-benzothiazine 1,1-Dioxide A mixture of 40.5 g. (0.15 mole) of 3-carbethoxy-4-hydroxy-2-methyl-2H-1,2-benzothiazine 1,1-dioxide, 20.6 g. (0.21 mole) of 3-amino-5-methylisoxazole, and 2500 ml. of xylene was refluxed for 24 hr. in a Soxhlet apparatus, the thimble of which contained 60 g. of Linde type 4A molecular sieve. The mixture was cooled to 25° and the resulting crystalline precipitate was collected and washed with ether to give 44 g. of crude product. Recrystallization from 1600 ml. of 1,4-dioxan gave 34.7 of material, m.p. 265–271° dec.

*Anal.*—Calcd. for $C_{14}H_{13}N_3O_5S$: C, 50.14; H, 3.91; N, 12.53; S, 9.56. Found: C, 50.33; H, 3.88; N, 12.30; S, 9.49.

The corresponding sodium salt was prepared by treating the above compound with sodium hydroxide which has the following structural formula:

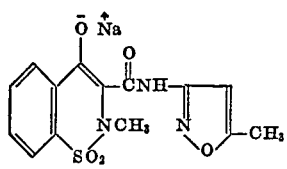

The sodium salt after recrystallization from ethanol has m.p. 270–272° dec.

*Anal.*—Calcd. for $C_{14}H_{12}N_3O_5SNa$: C, 47.06; H, 3.39; N, 11.76; S, 8.97. Found: C, 47.09; H, 3.69; N, 11.50; S, 8.81.

EXAMPLE II

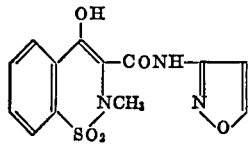

4-Hydroxy-3-(3-isoxazolylcarbamoyl)-2-methyl-2H-1,2-benzothiazine 1,1-Dioxide

A mixture of 4.15 g. (0.0155 mole) of 3-carbethoxy-4-hydroxy-2-methyl-2H-1,2-benzothiazine 1,1-dioxide, 1.3 g. (0.0155 mole) of 3-aminoisoxazole, and 500 ml. of xylene was refluxed for 24 hr. in a Soxhlet apparatus, the thimble of which contained 10 g. of Linde 4A molecular sieve. The mixture was cooled to 25° and the resulting crystalline precipitate was collected and washed with ether to give 3.2 g. of product, m.p. 235–240° dec. Recrystallization from 175 ml. of ethyl acetate gave 1.6 g. of material, m.p. 237–240° dec.

*Anal.*—Calcd. for $C_{13}H_{11}N_3O_5S$: C, 48.60; H, 3.45; N, 13.08; S, 9.98. Found: C, 48.77; H, 3.44; N, 12.86; S, 9.85.

EXAMPLE III

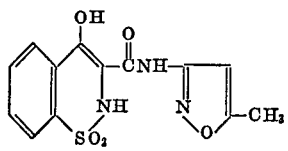

4-Hydroxy-3-(5-methyl-3-isoxazolylcarbamoyl)-2H-1,2-benzothiazine 1,1-Dioxide

A mixture of 15.3 g. (0.06 mole) of 3-carbethoxy-4-hydroxy-2-methyl-2H-1,2-benzothiazine 1,1-dioxide, 5.9 g. (0.06 mole) of 3-amino-5-methylisoxazole, and 800 ml. of xylene was refluxed for 24 hr. in a Soxhlet apparatus, the thimble of which contained 20 g. of Linde type 4A molecular sieve. The mixture was cooled to 25° and the resulting precipitate was collected and washed with ether to give 11.5 g. of crude product, m.p. 242–248° dec. Recrystallization from 300 ml. of 1,4-dioxan gave 11.2 g. of crystalline product, m.p. 254–257° dec.

*Anal.*—Calcd. for $C_{13}H_{11}N_3O_5S$: C, 48.60; H, 3.45; N, 13.08; S, 9.98. Found: C, 48.67; H, 3.44; N, 12.91; S, 10.23.

EXAMPLE IV

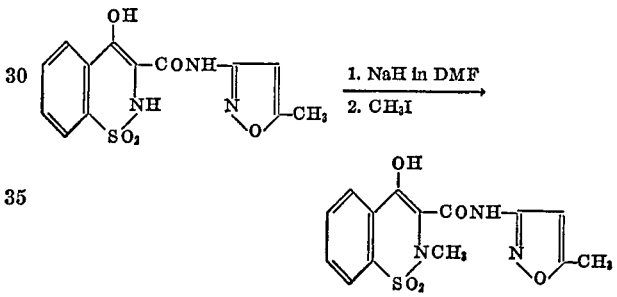

To a mixture of 0.01 mole (as a 57% dispersion in mineral oil) and 3.21 g. (0.01 mol) of Compound IV was added 20 ml. of dry dimethylformamide. The mixture was stirred for one hour during which hydrogen evolved and the dark brown anion formed. A solution of 1.42 g. (0.01 mol) of methyl iodide in dimethylformamide was added, the reaction mixture was stirred at 60° for 4 hours, and then at 25° for 16 hours. It was diluted with 20 ml. of water and stirred for one hour. The resulting precipitate was collected, washed with two 10 ml. portions of dimethylformamide and one 20 ml. portion of methanol and air dried. Yield: 2.7 g. of white solid, m.p. 259–262° dec.

We claim:

1. A compound of the formula:

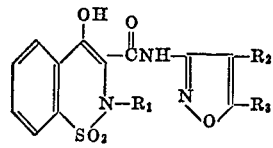

I wherein $R_1$ is hydrogen or methyl and $R_2$, and $R_3$ are hydrogen or alkyl having 1 to 7 carbon atoms, or its corresponding alkali metal, alkaline earth and amine salts.

2. A compound according to Claim 1 which is 4-Hydroxy - 3 - (5 - methyl - 3 - isoxazolylcarbamoyl)-2-methyl-2H-1,2-benzothiazine 1,1-Dioxide.

3. A compound according to Claim 1 which is 4-Hydroxy - 3 - (3 - isoxazolylcarbamoyl) - 2 - methyl-2H - 1,2-benzothiazine 1,1-Dioxide.

4. A compound according to Claim 1 which is 4-Hydroxy - 3 - (5 - methyl - 3 - isoxazolylcarbamoyl) - 2H-1,2-benzothiazine 1,1-Dioxide.

5. A process for production of the compound of Claim 1 which comprises refluxing together a compound of Structure II:

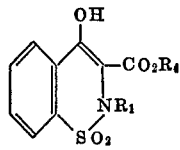

in which $R_4$ is lower alkyl with a compound of Structure III:

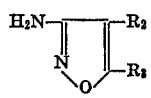

in an inert solvent in the presence of a molecular sieve adapted to remove the by-product alcohol formed.

6. A process for the production of the compound of Claim 2 which comprises treating a compound of the formula:

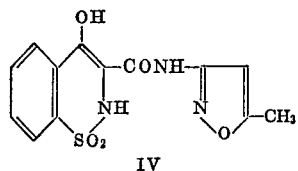

with sodium hydride in dimethylformamide, treating the resulting anion with methyl iodide; adding water to the reaction mixture; and recovering compound I as a precipitate.

References Cited
UNITED STATES PATENTS

| | | | |
|---|---|---|---|
| 3,646,021 | 2/1972 | Zinnes et al. | 260—243 |
| 3,704,298 | 11/1972 | Zinnes et al. | 260—243 |
| 3,714,155 | 1/1973 | Zinnes et al. | 260—243 |

JOHN M. FORD, Primary Examiner

U.S. Cl. X.R.

424—246